US007433082B2

(12) United States Patent
Takenaka et al.

(10) Patent No.: US 7,433,082 B2
(45) Date of Patent: Oct. 7, 2008

(54) METHOD OF, APPARATUS FOR, AND COMPUTER PROGRAM FOR IMAGE PROCESSING

(75) Inventors: Hirokazu Takenaka, Kanagawa (JP); Hiroyuki Shibaki, Tokyo (JP); Satoshi Ouchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 822 days.

(21) Appl. No.: 10/732,442

(22) Filed: Dec. 11, 2003

(65) Prior Publication Data

US 2004/0179237 A1 Sep. 16, 2004

(30) Foreign Application Priority Data

Dec. 11, 2002 (JP) ............................ 2002-359424

(51) Int. Cl.
*H04N 1/40* (2006.01)

(52) U.S. Cl. ........................................ 358/2.1; 358/1.9

(58) Field of Classification Search ................. 358/1.9, 358/2.1, 453–462, 538, 2.14
See application file for complete search history.

(56) References Cited

U.S. PATENT DOCUMENTS 5,075,787 A * 12/1991 Shaughnessy et al. ....... 358/452
5,138,465 A * 8/1992 Ng et al. ..................... 358/453
5,404,294 A * 4/1995 Karnik ....................... 715/507
5,418,899 A 5/1995 Aoki et al.
5,464,200 A 11/1995 Nakazato et al.
5,708,949 A 1/1998 Kasahara et al.
5,797,074 A 8/1998 Kasahara et al.
5,825,937 A 10/1998 Ohuchi et al.
5,850,298 A 12/1998 Narahara et al.
5,911,004 A 6/1999 Ohuchi et al.
5,930,369 A 7/1999 Cox et al.
5,960,246 A 9/1999 Kasahara et al.
6,208,735 B1 3/2001 Cox et al.
6,259,813 B1 7/2001 Ouchi
6,480,623 B1 11/2002 Yagishita et al.
6,549,657 B2 4/2003 Ohta et al.
6,556,707 B1 4/2003 Yagishita et al.

(Continued)

FOREIGN PATENT DOCUMENTS

JP 08-137332 5/1996

(Continued)

OTHER PUBLICATIONS

U.S. Appl. No. 10/986,781, filed Nov. 15, 2004, Matsuura et al.

(Continued)

*Primary Examiner*—Thomas D Lee
*Assistant Examiner*—Stephen M Brinich
(74) *Attorney, Agent, or Firm*—Oblon, Spivak, McClelland, Maier & Neustadt, P.C.

(57) ABSTRACT

An image processing apparatus creates attribute information that indicates characteristics of an image from an image data, stores the attribute information created, determines, when a new image data is input from outside, whether the attribute information created from the new image data exists in the attribute information stored. If the attribute information created from the new image data is in the attribute information stored, the image processing apparatus specifies the attribute information, and processes the image data based on the attribute information specified.

17 Claims, 10 Drawing Sheets

U.S. PATENT DOCUMENTS

| | | | |
|---|---|---|---|
| 6,704,444 | B2 | 3/2004 | Yagishita et al. |
| 7,103,221 | B2 | 9/2006 | Ohta et al. |
| 2002/0061133 | A1 | 5/2002 | Ohta et al. |
| 2003/0067632 | A1 | 4/2003 | Ohta et al. |
| 2004/0179237 | A1 | 9/2004 | Takenaka et al. |
| 2006/0008146 | A1 | 1/2006 | Ohta et al. |

FOREIGN PATENT DOCUMENTS

| | | |
|---|---|---|
| JP | 09-27905 | 1/1997 |
| JP | 09-191394 | 7/1997 |
| JP | 3134756 | 2/2001 |
| JP | 2001-157044 | 6/2001 |
| JP | 2002-223351 | 8/2002 |

OTHER PUBLICATIONS

U.S. Appl. No. 10/238,784, filed Sep. 11, 2002, Miyagi et al.
U.S. Appl. No. 10/287,630, filed Nov. 5, 2002, Miyagi et al.
U.S. Appl. No. 10/119,957, filed Apr. 11, 2002, Morimoto et al.
U.S. Appl. No. 10/188,133, filed Jul. 3, 2002, Suino et al.
U.S. Appl. No. 10/096,823, filed Mar. 14, 2002, Hirano et al.
U.S. Appl. No. 08/310,078, filed Sep. 22, 1994.
U.S. Appl. No. 08/407,656, Mar. 21, 1995.
U.S. Appl. No. 09/473,647, filed Dec. 28, 1999, Okubo et al.
U.S. Appl. No. 09/663,843, filed Sep. 15, 2000, Okubo et al.
U.S. Appl. No. 09/775,601, filed Feb. 5, 2001, Shibaki et al.
U.S. Appl. No. 10/391,211, filed Mar. 19, 2003, Morimoto et al.
U.S. Appl. No. 10/732,442, filed Dec. 11, 2003, Takenaka et al.

* cited by examiner

| | | | | | | |
|---|---|---|---|---|---|---|
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |

FIG.3B

| | | | | | | |
|---|---|---|---|---|---|---|
| -1 | -1 | -1 | -1 | -1 | -1 | -1 |
| -1 | -1 | -1 | -1 | -1 | -1 | -1 |
| -1 | -1 | -1 | -1 | -1 | -1 | -1 |
| 0 | 0 | 0 | 0 | 0 | 0 | 0 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

FIG.3C

| | | | | | | |
|---|---|---|---|---|---|---|
| 0 | 1 | 1 | 1 | 1 | 1 | 1 |
| -1 | 0 | 1 | 1 | 1 | 1 | 1 |
| -1 | -1 | 0 | 1 | 1 | 1 | 1 |
| -1 | -1 | -1 | 0 | 1 | 1 | 1 |
| -1 | -1 | -1 | -1 | 0 | 1 | 1 |
| -1 | -1 | -1 | -1 | -1 | 0 | 1 |
| -1 | -1 | -1 | -1 | -1 | -1 | 0 |

FIG.3D

| | | | | | | |
|---|---|---|---|---|---|---|
| 1 | 1 | 1 | 1 | 1 | 1 | 0 |
| 1 | 1 | 1 | 1 | 1 | 0 | -1 |
| 1 | 1 | 1 | 1 | 0 | -1 | -1 |
| 1 | 1 | 1 | 0 | -1 | -1 | -1 |
| 1 | 1 | 0 | -1 | -1 | -1 | -1 |
| 1 | 0 | -1 | -1 | -1 | -1 | -1 |
| 0 | -1 | -1 | -1 | -1 | -1 | -1 |

| | | | | |
|---|---|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG.3F

| | | | | |
|---|---|---|---|---|
| -1 | -1 | -1 | -1 | -1 |
| -1 | -1 | -1 | -1 | -1 |
| 0 | 0 | 0 | 0 | 0 |
| 1 | 1 | 1 | 1 | 1 |
| 1 | 1 | 1 | 1 | 1 |

FIG.3G

| | | | | |
|---|---|---|---|---|
| 0 | 1 | 1 | 1 | 1 |
| -1 | 0 | 1 | 1 | 1 |
| -1 | -1 | 0 | 1 | 1 |
| -1 | -1 | -1 | 0 | 1 |
| -1 | -1 | -1 | -1 | 0 |

FIG.3H

| | | | | |
|---|---|---|---|---|
| 1 | 1 | 1 | 1 | 0 |
| 1 | 1 | 1 | 0 | -1 |
| 1 | 1 | 0 | -1 | -1 |
| 1 | 0 | -1 | -1 | -1 |
| 0 | -1 | -1 | -1 | -1 |

METHOD OF, APPARATUS FOR, AND COMPUTER PROGRAM FOR IMAGE PROCESSING

CROSS-REFERENCE TO RELATED APPLICATIONS

The present document incorporates by reference the entire contents of Japanese priority document, 2002-359424 filed in Japan on Dec. 11, 2002.

BACKGROUND OF THE INVENTION

1) Field of the Invention

The present invention relates to a technology for image processing, and more particularly a method of, an apparatus for, and a computer program for an image processing in a digital color copier, a color printer, a color facsimile machine, and the like.

2) Description of the Related Art

A technology known as the image area separation is currently in use for image processing in digital a color copier, a color printer, a color facsimile machine, and the like. The image area separation is a process in which pixel areas of an image being scanned are recognized as a character area or an intermediate tone area of a picture, etc. and an image area separation data (attribute information) is created for each pixel. Appropriate processes for the character areas and the intermediate tone areas are carried out with a help of the image area separation data. For instance, based on the image area separation data, a space filtering process may be carried out to enhance a resolution of the character area, or an intermediate toning process may be carried out to enhance a contrast of the intermediate tone area.

A color image that is output from the digital color copier is obtained by superposing four color plates, K (black), C (cyan), M (magenta), and Y (yellow). In order to control a printing timing of the different color plates, the image needs to be stored once in memory. However, to avoid occupation of too much memory, a method is adopted by which image data is compressed before being storing in a memory. Recently, there has been a rising demand to not only be able to obtain an output of a scanned image output, but also to be able to store the image as a digital data, to be output whenever required, obviating a need for an original document for a subsequent copies, or to be used on a personal computer (PC), and the like. For these purposes as well, the image data needs to be compressed to an appropriate size. It has therefore become common in the image processing of the digital color copier to incorporate a step of compressing the image data and storing the data in the memory.

FIG. 10 is a block diagram of a flow of image processing of a copier. As illustrated in FIG. 10, a compression process and a decompression process take place between a filtering process and a color correction process. The processes involving the image area separation data are the color correction process and the intermediate toning process, both of which take place after the compression process. Therefore, it is necessary for a timing of the image area separation data to coincide with a timing of the image data. For instance, an image processing apparatus that is disclosed in U.S. Pat. No. 3,134,756 includes an image area separating unit that separates an input image data into a binary image area composed of a character or a line data and an intermediate toner image area composed of a picture or a halftone print, etc. A first image processing based on the image area separation data is then carried out. The image data and the image area separation data are then compressed and stored. The stored data are then decompressed. Based on the decompressed image data, a second image processing is then carried out on the decompressed image data. As described in U.S. Pat. No. 3,134,756, as the timing of the image area separation data coincides with the timing of the image data, the image area separation data is also compressed once and stored in the memory.

If scanned image data is to be transferred as a digital data to the personal computer (PC), instead of being output on a paper, any data at any stage of the processing can be transferred. However, it would be ideal if the image data that is transferred to the PC is the image data that is compressed and stored in the memory. The name of the image data thus transferred may be edited on the PC and may also be output on a paper. In order to be able to obtain an output on a paper, the edited data, which has been processed only up to the compression stage, must once again be entered in the memory so that the image quality is identical with that of a normal copier system. However, once an image that is transferred to another device and is read again loses its image area separation data (attribute information). Consequently, a process switching based on the image area is not possible, resulting in inferior image quality. Even if the image area separation data (attribute information) is created again for the image data that has been transferred to an outside device and scanned again, the separation accuracy would be low as compared to the image area separation data (attribute information) of the original image due to a fact that the image data has been compressed.

SUMMARY OF THE INVENTION

It is an object of the present invention to solve at least the problems in the conventional technology.

The apparatus for image processing according to one aspect of the present invention includes a first attribute creating unit that creates, from a first image data, a first attribute information that indicates image characteristics, a storing unit that stores the first attribute information, a processing unit that carries out different processing for different image area of the first image data based on the first attribute information, a transferring unit that transfers the first image data to outside, an input unit that inputs a second image data from the outside, and a determining unit that determines whether the first attribute of the second image data is stored in the storing unit, and specifies the first attribute information as an active attribute information upon determining that the first attribute information of the second image data is stored in the storing unit, wherein the processing unit carries out a processing of the second image data based on the active attribute information.

The method of image processing according to another aspect of the present invention includes creating, from a first image data, a first attribute information that indicates image characteristics, storing the first attribute information, performing different processing for different image area of the first image data based on the first attribute information, transferring the first image data to outside, inputting a second image data from the outside, determining unit whether the first attribute of the second image data is stored in the storing unit, specifying the first attribute information as an active attribute information upon determining that the first attribute information of the second image data is stored in the storing unit, and performing different processing for different image area of the first image data based on the active attribute information.

The computer program for image processing according to still another aspect of the present invention realizes the method according to the present invention on a computer.

The computer-readable recording medium according to still another aspect of the present invention stores a computer program for image processing according to the present invention.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is depicts an example of a mask used in the edge detection;

DETAILED DESCRIPTION

Exemplary embodiments of a method of, an apparatus for, and a computer program for image processing according to the present invention are explained in detail with reference to the accompanying drawings. However, it is to be noted that the invention is not limited by the embodiments described herein.

Figure 1:
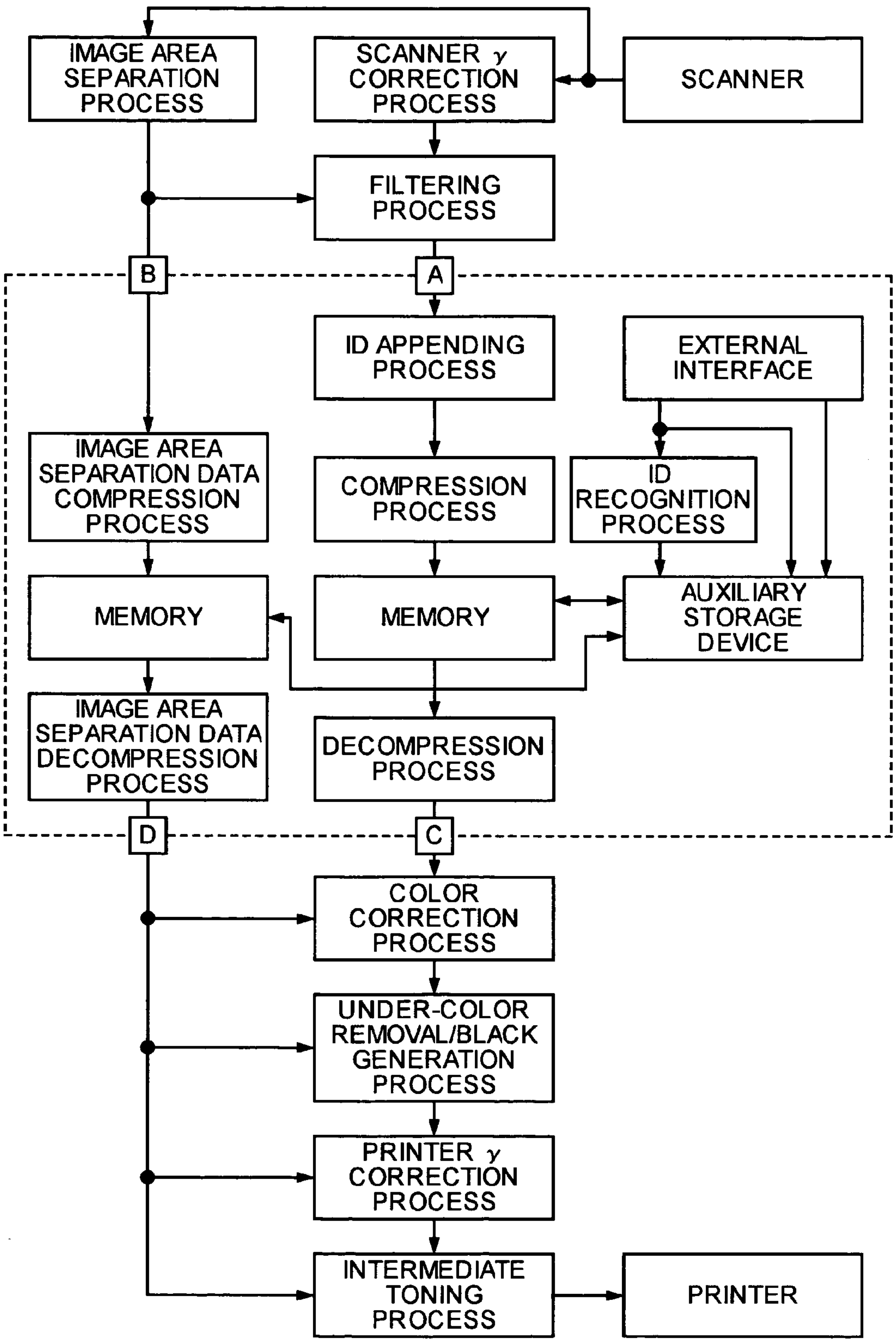
FIG. 1 is a block diagram of an example of an image processing apparatus according to the present invention.

FIG. 1 is a block diagram of an example of an image processing apparatus according to the present invention. For the sake of convenience, the image processing apparatus is taken as a color copier with an external device interface function. The apparatuses and the processes involved in the image processing flow in the copier part of the apparatus will be explained first.

The scanner in FIG. 1 reads the original image information by breaking the image up into small areas. Reading of the image information takes place in the following way. The charged couple device reads the RGB (red, green, and blue) components of a laser beam emitted by a laser light source and converts them to signals. These signals are then digitized and the image data is read in proportion to the reflection coefficient.

The image area separation process involves determining if each pixel area of the image data is a character area or a picture area and creating an image area separation data (attribute information) based on the result of the determination. Thus, with the help of the image area separation data, an image processing suited to each area can be carried out. The image area separation process carries out edge detection, halftone detection, etc., and if the area is a non-halftone or an edge, the area is taken to be a character area (a binary image area composed of a character or a line). If the area is not a non-halftone or an edge, the area is taken to be a picture area (an intermediate toner image area such as a picture or a halftone print).

Figure 2:
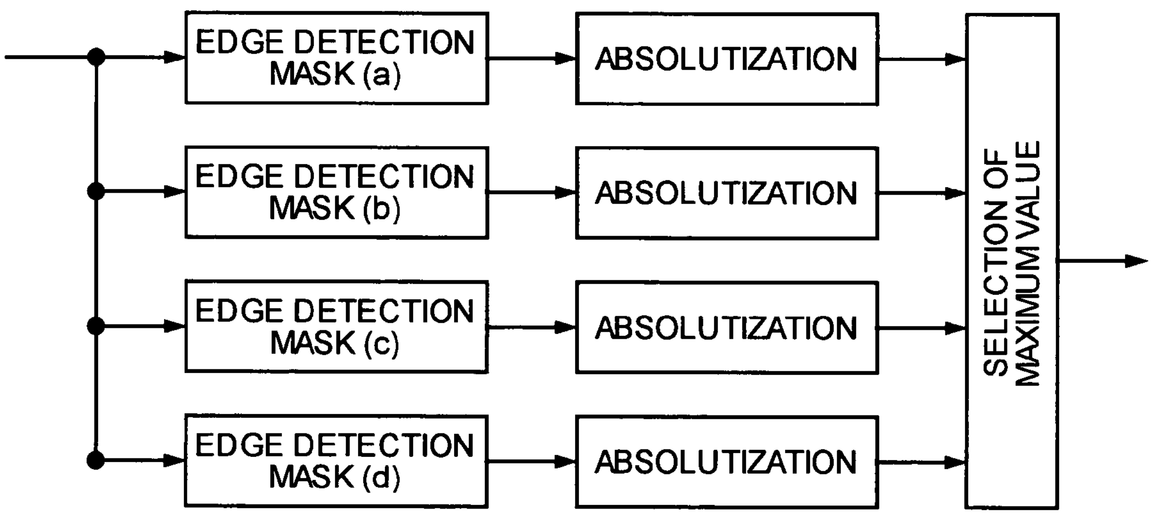
FIG. 2 is a block diagram for illustrating a method of edge detection.

FIG. 2 is a block diagram for illustrating a method of edge detection. This edge detection method employs 5×5 or a 7×7 edge detection masks illustrated in FIG. 3A to FIG. 3H (in the illustrated example, four types of masks are used) for the masking process in order to calculate the edge amount. Each of the four types of masks detects edge vertically, horizontally, and diagonally. In the example illustrated in FIG. 2, the four edge values are absolutized and the highest value is used. If this absolutized highest edge amount value is greater than a specific threshold value, then the area is determined to be an edge area, and if less than the specific threshold value, the area is determined to be a non-edge area. Methods apart from the one illustrated in FIG. 2 may also be used for edge detection.

The halftone detection may be carried out, for instance, by employing the peak pixel detection method disclosed in the article titled "Image area separating method for graphics containing characters and images (halftone, picture), Electronic Information Communication Society, vol. J75-D-II No. 1 pp. 39-47, January 1992". In the peak pixel detection, it is determined from the concentration relation with the surrounding pixels whether the pixel of interest is a peak indicating the peak of the change in density. To be more specific, when the density level of the central pixel in a block formed from M×M pixels is higher or lower than the density level of the surrounding pixels, it is determined whether the central pixel is a peak pixel by the following method.

Figure 4A:
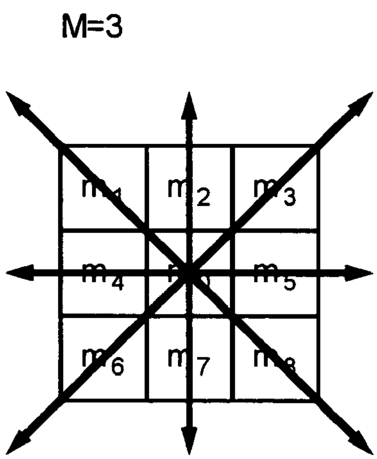
FIG. 4 depicts a method of peak pixel detection.

In other words, when the block is as shown in FIG. 4A (that is, when M=3), whether or not the pixel is a peak pixel is determined by the following expression (1):

$$|2m_0 - m_j - m_8| \geq \Delta m_{TH} \text{ and} \quad (1)$$
$$|2m_0 - m_2 - m_7| \geq \Delta m_{TH} \text{ and}$$
$$|2m_0 - m_3 - m_6| \geq \Delta m_{TH} \text{ and}$$
$$|2m_0 - m_4 - m_5| \geq \Delta m_{TH}$$

Figure 4B:
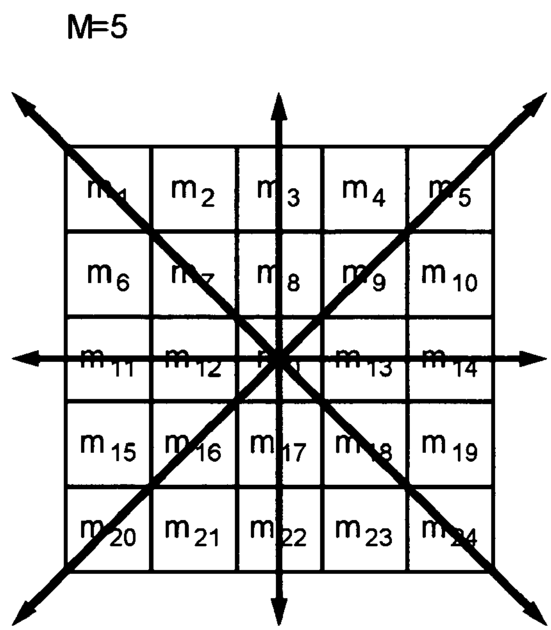

When the block is as shown FIG. 4B (that is, when M=5), whether or not the pixel is a peak is determined by the following expression (2):

$$|2m_0 - m_3 - m_{22}| \geq \Delta m_{TH} \text{ and} \quad (2)$$
$$|2m_0 - m_8 - m_{17}| \geq \Delta m_{TH} \text{ and}$$
$$|2m_0 - m_1 - m_{24}| \geq \Delta m_{TH} \text{ and}$$
$$|2m_0 - m_7 - m_{18}| \geq \Delta m_{TH}$$

In other words, when the absolute value obtained from the difference between the average value of the pixel levels of the pixels on either side of the central pixel and the density of the central pixel is greater than the threshold value $\Delta m_{TH}$, the central pixel is determined to be a peak. Based on the peak pixel data, it can be judged whether the peak pixel area is a halftone area or not. To explain in the simplest terms, this is done by counting the peak pixels for each block of a predetermined size and judging a block to be a halftone area if the number of peak pixels is not less than a predetermined number n.

Any other method may also be used in the halftone area detection. Also, the areas may be separated on the basis of character/halftone/picture areas or black and white character/color character/image area, etc. In the image area separation process, an image area separation method may be employed according to the method of separation of areas to be judged. Further, edge detection and halftone detection need not necessarily be a binary decision but can create multinary attribute information like the image area separation process. For instance, for edge detection, a multinary attribute information can be created by using a number of threshold values that binarize the edge value.

A scanner γ correction process converts an image signal that is read in proportion to the reflection coefficient to an image signal that is proportional to the density.

A filtering process carries out changes such as noise elimination, sharpening of characters, etc. in order to improve the image quality by smoothing or enhancing character edges. The filtering process carries out suitable processes for character areas/picture areas in accordance with the image area separation data (attribute information) created by the image area separation process. For instance, in the character area the filtering process would carry out a process that favors sharpness in order to enhance high frequency components, and in the picture area the filter process would carry out smoothing in order to emphasize contrast.

A compression process compresses the post-filtered image data. The compression method used is irreversible. For instance JPEG (Joint Photographic Experts Group) method among the existing methods may be used. Besides, compression methods using conventional technology may also be used. The image data compressed by the compression process is stored as a small sized data in memory, and is expanded by an expansion process according to a predetermined timing.

An image area separation data compression process is a process by which the image area separation data (attribute information) created by the image area separation process is compressed. It is preferable to use a reversible method for compressing the image area separation data, since it is vital to hold the entire data. JBIG (Joint bi-level Image Expert Group) method, for instance, can be employed. The image area separation data (attribute information) compressed by the image area separation data compression process is stored in the memory and is expanded by the image area separation data expansion process in time with the expansion with the image data.

The image data, image area separation data (attribute information) thus compressed in the way described above can be stored, apart from memory, in an auxiliary storage device, taking into account the fact that the image data may require to be transferred outside and saved or processed. The auxiliary storage device should preferably be able to store a large volume of data, such as a hard disk. This is because, unlike the memory which is used for temporary storage, the auxiliary storage device needs to store data for a certain length of duration. By storing the image area separation data (attribute information) in the auxiliary storage device, the image area separation data (attribute information) can be activated for an image, data that input from outside. This will be explained in detail in a later section.

A color correction process converts the image signals read as RGB signals into densities of toner components CMY (cyan, magenta, and yellow).

An under color removal/black generation process removes the amount below the least density from among the component density of CMY as under color and replaces it with K (black) toner density component. This process also switches according to the image area separation data (attribute information), thereby improving the image quality. To be more specific, if the degree of replacement with respect to the minimum density is represented in percentage, that is, if the character area is 100% replaced, the black characters can be reproduced in mostly black, thereby suppressing flaws such as tinting. On the other hand, in the case of the picture area, roughness of texture due to achromatic areas is suppressed as the ratio of replacement is low.

A printer γ correction process converts image signals in accordance with the output characteristics of an image output unit (printer) and gradation characteristics of an intermediate toning process explained later. When the intermediate toning process carries out switching in accordance with the area, the printer γ correction also needs to switch accordingly. In the character area, for instance, the printer γ correction process carries out a binary density change in order to enhance the contrast of the character, and conversely, in the picture area the printer γ correction process carries out a gentle density change.

An intermediate toning process employs a dither process or an error diffusion process, and expresses multinary input gradients by output gradients which are normally fewer. The intermediate toning process also switches between error diffusion process and dither process according to the area. That is, when a character area is encountered, the intermediate toning process employs the error diffusion process to emphasize the resolution, and when a picture area is encountered, the dither process is employed to emphasize the contrast.

A printer section forms an output image according to the input image signals and prints on a paper, etc. The printer section also has functions of reproducing a color image using a four-color toner containing CMYK (cyan, magenta, yellow, and black) and reproducing a black-and-white image using a single-color black toner.

In the example illustrated in FIG. 1, the compression process and the decompression process take place after the filtering process and before the color correction process. However, the compression process and the decompression process may take place any time during the image processing. For instance, the compression process and the decompression process may be carried out after the under-color removal/black generation process and before the printer γ correction process. However, in this case, the image may be compressed and stored by CMYK signals.

The processes described above, when carried out in the sequence in which they have been described, essentially are the processes of a copier.

It is generally preferable to compress the image data and decrease the data volume when transferring the image data to the outside. Accordingly, as shown in FIG. 1 the image data that is stored in the auxiliary storage device after compression is slated for transfer to the outside. The ID appending process that takes place the compression process appends an ID data to the image data to be transferred outside. The ID data identifies the image area separation data (attribute information) created from the image data. Therefore, the image area separation data (attribute information) and the ID data stored in the auxiliary storage device always need to be stored as a set. Also, since the specifications of the image area separation data vary with the model, device, etc., the ID data should preferably identify the model or the device. The ID data may be a number that is correlated with the model and the image area separation data. One method for appending the ID data could be to append the ID data as a header or footer to the image data. However, appending a header or footer can make the format unique to the system and versatility for using in other systems will be lost. Therefore, a method that embeds the ID data in the image data itself would be preferable. However, embedding the ID data in the image data can affect the image quality adversely. Therefore, methods by which the decline in quality is not discernable have been explored. For instance, a technology known as digital watermarking, disclosed in Japanese Patent Laid-Open Publication No. H9-191394, employs the technique of embedding copyright information in the image data in order to prevent counterfeiting without a discernable loss of quality of the image.

When a compressed image data is input from outside in order to be output on paper, etc., the image data is first input into the memory and the subsequent processes are the same as those of the copier. This image data is also input in the ID recognizing process. The ID recognizing process involves extraction of the ID data appended to the image data, and based on the ID data, invoking the image area separation data (attribute information) corresponding to the image data from the auxiliary storage device. If the ID data is appended as a header, the extraction method of the ID data may be simply to read the header. If the ID data is embedded as a digital watermark, a method appropriate for the embedding method used may be employed to extract the ID data.

Figure 5:
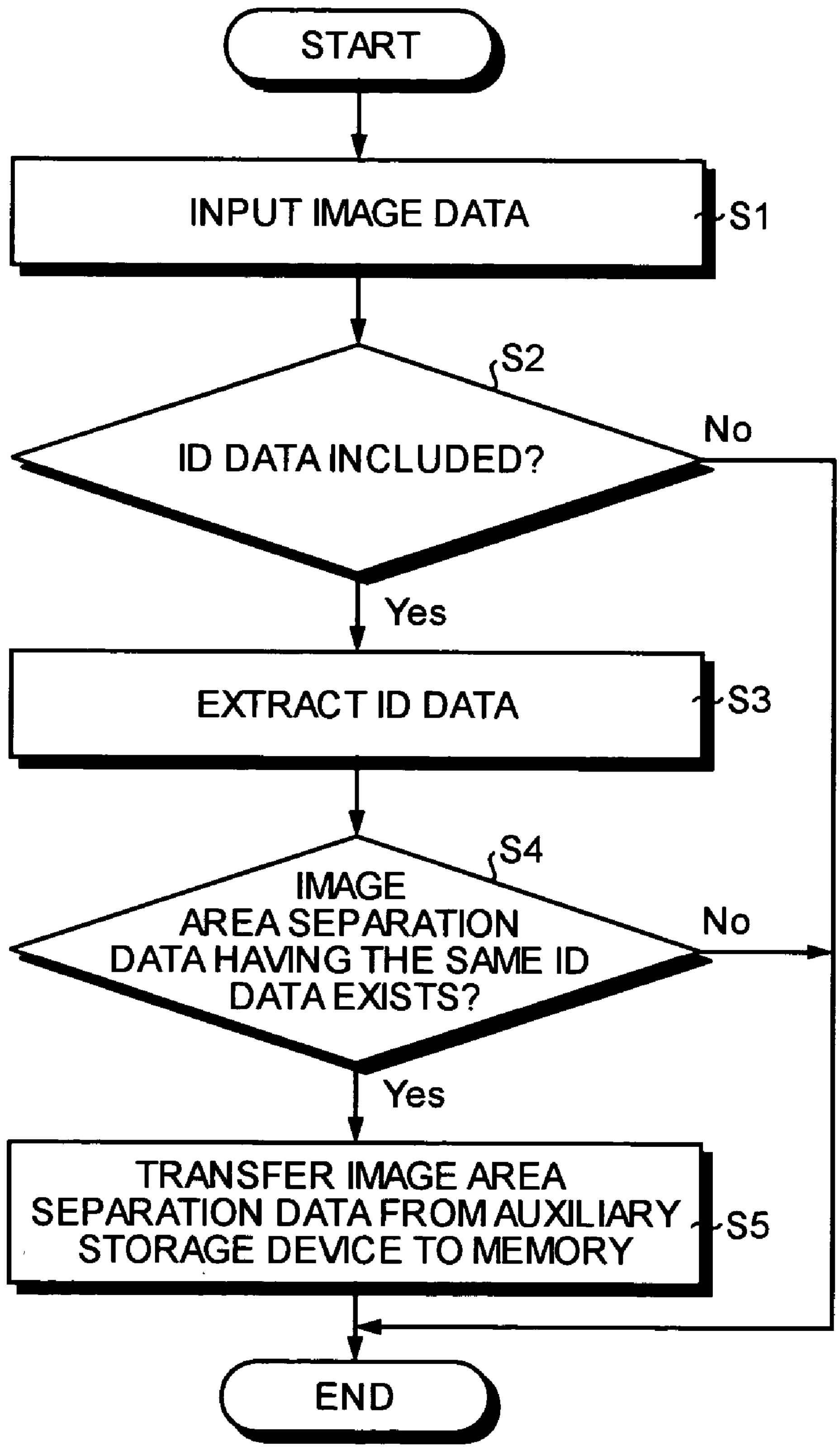
FIG. 5 is a flow chart of an example of an ID recognition process.

FIG. 5 is a flow chart of an ID recognizing process. When an image data is input (step S1), the ID recognizing process determines whether the input image data includes the ID data or not (step S2). If the ID data is included, the ID information is extracted (step S3), and it is determined if an image area separation data (attribute information) having the same ID data exists in the auxiliary storage device (step S4). If an image area separation data (attribute information) having the same ID data exists in the auxiliary storage device, the image area separation data (attribute information) is read from the auxiliary storage device and transferred to the memory (step S5), thereby realizing the process of outputting the image.

The course of action in the case in which the ID data is not included in the input image data or in the case in which even if the ID data is present, there is no image area separation data (attribute information) having the same ID data is not described here. However, in such cases, a process suitable to the entire picture may be carried out without resorting to the image area separation data (attribute information). Alternatively, as disclosed in the conventional technology (Japanese Patent Laid-Open Publication No. 9-027905), a different image area separation process suitable to the external data may be provided, and the image area separation data (attribute information) may be created with the help of the image area separation process.

Thus, according to the present invention, the created image area separation data (attribute information) is stored. When an image data is input from outside, it is determined if an image area separation data (attribute information) corresponding to the input image data is present or not. If it is determined that the image area separation data (attribute information) corresponding to the input image data is present, processes suitable to each area are carried out.

In other words, according to the present invention, even if an image data is input again after it has been transferred outside can be processed by using an appropriate image area separation data (attribute information). Consequently, a high image quality comparable to that of a copier can be obtained.

Thus, the image processing apparatus according to the present invention includes a attribute information creating unit that creates attribute information that indicate the image characteristics from the image data, a storing unit that stores the attribute information created by the attribute information creating unit, a processing unit that carries out processing of the image data according to the area, a transferring unit that transfers to the outside the image data for which attribute information is created, an input unit that inputs the image data from outside, a specifying unit that determines whether or not the attribute information created from the image data input from outside is stored in the storing unit, and if present, specifies the attribute information, and a processing unit that, if the specifying unit specifies the attribute information for the image data input from outside, carries out the processing using the specified attribute information.

The attribute information creating unit can be made to include an image area separation processing function by which it can determine from the image characteristics whether an area is a character area or a picture area.

Alternatively, the attribute information creating unit can be made to include an image area separation processing function by which it can determine from the image characteristics whether an area is a black character area or a color character area or a picture area.

Alternatively, the attribute information creating unit can be made to include an image area separation processing function by which it can determine from the image characteristics whether an area is a character area or a halftone area or a picture area.

The image processing apparatus according to the present invention may also be provided with an appending unit that appends a specific data (such as an ID data) to the attribute information created from the image data input from outside so that the attribute information can be specified. The specifying unit in this case determines whether the specific data is included in the input image data. If the specific data is present in the image data, the specifying unit extracts the specific data and using the specific data specifies the attribute information.

The appending unit may append the specific data as a header or footer to the image data. Alternatively, the appending unit may embed the specific data in the image data itself.

Figure 6:
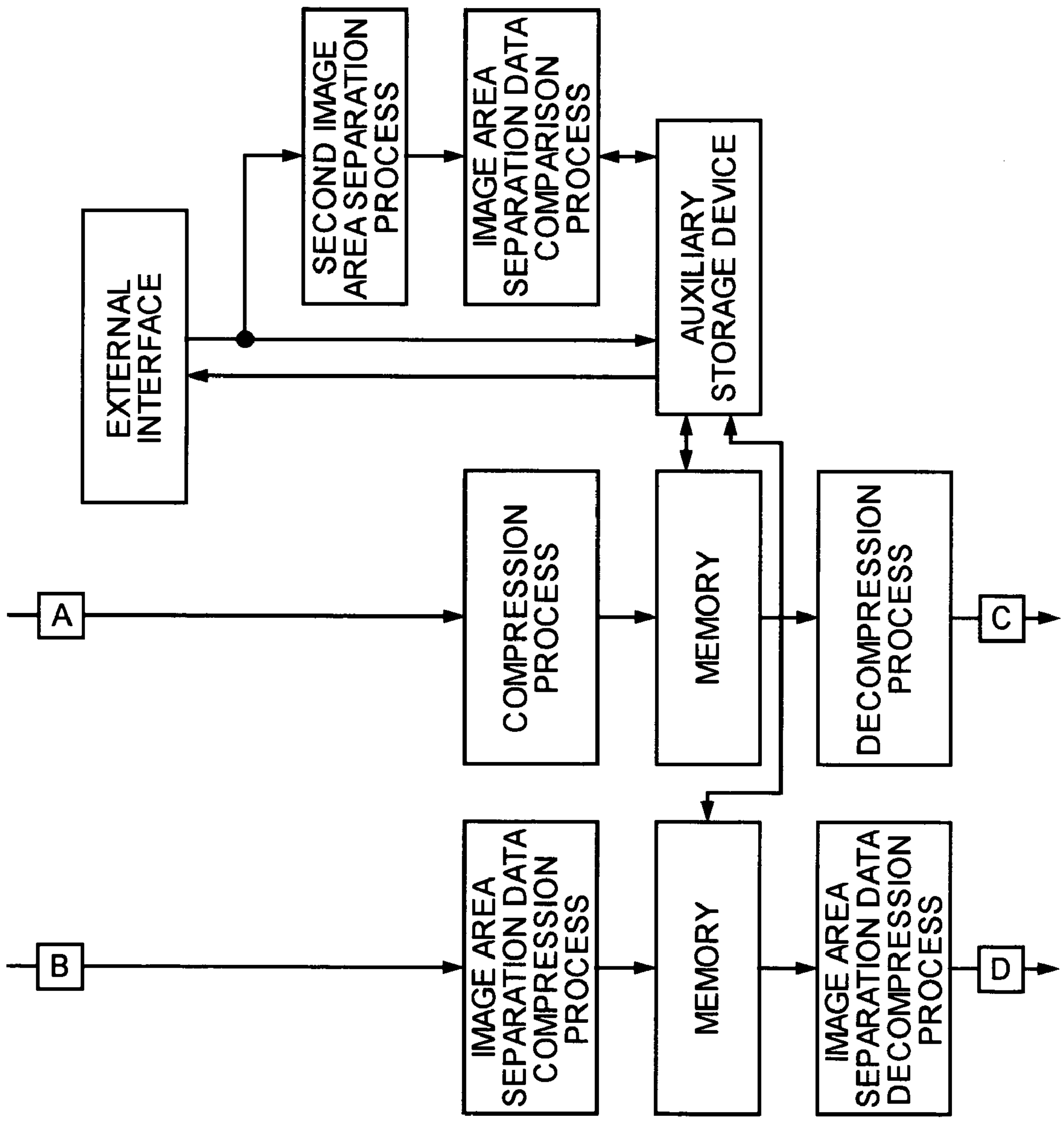
FIG. 6 is a block diagram of another example of the image processing apparatus according to the present invention.

FIG. 6 a block diagram of another example of the image processing apparatus according to the present invention. The reference symbols A, B, C, and D in FIG. 6 represent the same positions as in FIG. 1. The processes preceding A and B and the processes following C and D are identical to those illustrated in FIG. 1 and hence are omitted.

In the structure illustrated in FIG. 6, the method of image area separation data (attribute information) specification is different from that of FIG. 1. In other words, as shown in FIG. 6, a second image area separation process carries out a second image area separation on the input image data and creates a second image area separation data (second attribute information). If the image area separation data (attribute information) stored in the auxiliary storage device can be called a first image area separation data (first attribute information), an image area separation data comparison process in FIG. 6 compares the first image area separation data (the first attribute information) and the second image area separation (the second attribute information) and specifies the image area separation data (attribute information).

The process of inputting from and outputting to outside the image data will be explained next with reference to the example shown in FIG. 6.

When transferring the image data outside, unlike the process shown in FIG. 1 in which a special process is carried out, the compressed image data is transferred as it is. On the other hand, when inputting the image data from outside, the second image area separation data (second attribute information) is created by the second image area separation process. If the input image data is a compressed image data, decompression is carried out. The second image area separation process need not have the same structure as the first image area separation process and may be employ a method in which the parameters or the method itself is different. The data format itself may also be different.

The separation accuracy of the second image area separation data (second attribute information) is generally inferior to that of the first image area separation data (first attribute information). This is because, the image data input from outside is irreversibly compressed and the image separation process is often carried out on a low-quality image. Consequently, the image processing yields better results with the first image area separation data (first attribute information) as compared to the second image area separation data (second attribute information). Therefore, the first image area separation data (first attribute information) is specified with the image area separation data comparison process using the method described below.

In other words, the specification method involves comparison of the second image area separation data (second attribute information) created by the second image area separation process with the first image area separation data (first attribute information) stored in the in the auxiliary storage device. If the two data are found to be similar, the first image separation data (first attribute information) is specified.

Figure 7:
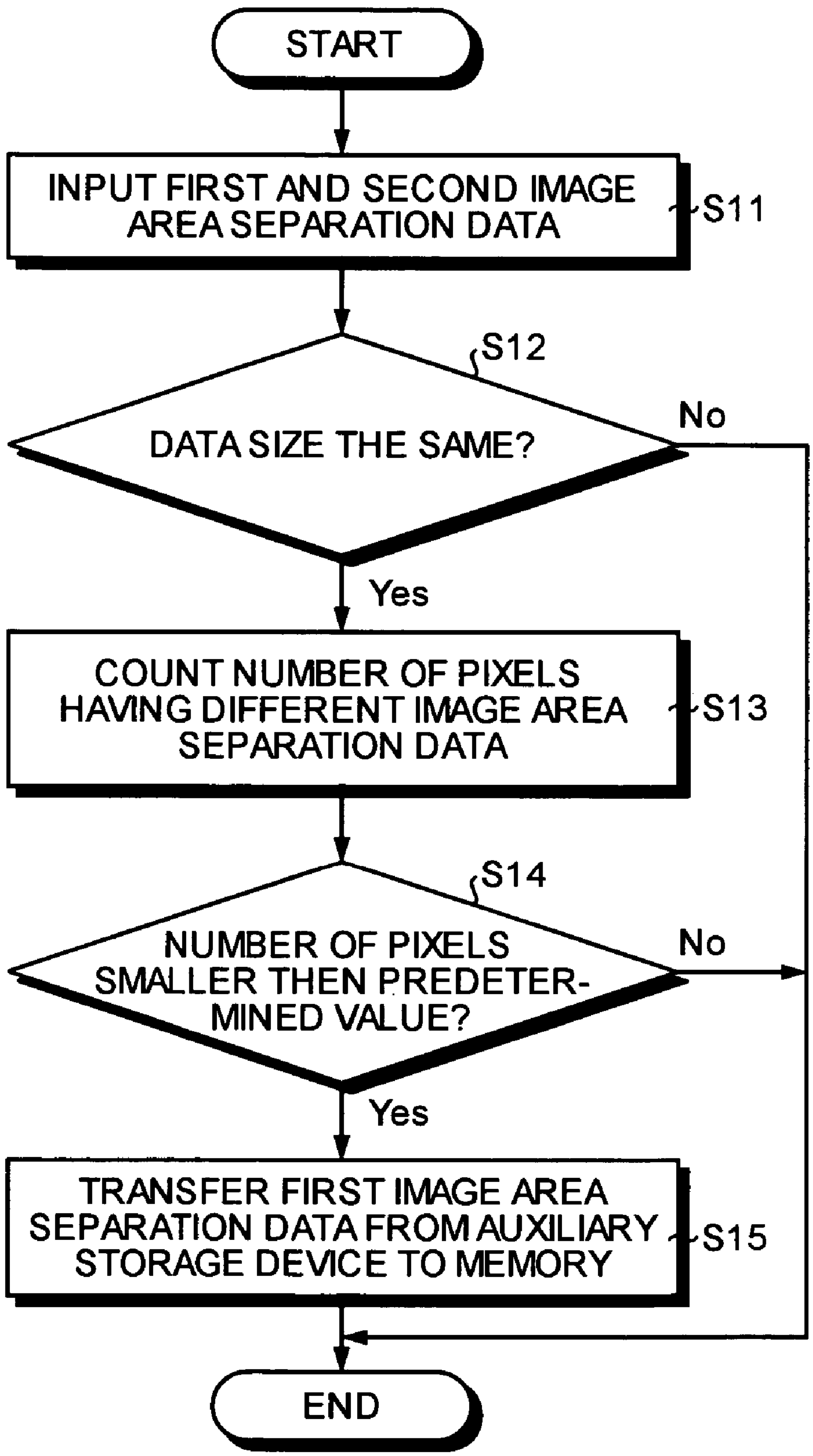
FIG. 7 is a flow chart of an example of an image area separation data comparison process.

FIG. 7 is a flow chart of an example of an image area separation data comparison process. Upon input of the first and the second image area separation data (first and second attribute information) (step S11), it is first determined whether the image data size is the same (step S12). It is supposed that the format of the second image area separation data (second attribute information) is the same as the format of the first image area separation data (first attribute information). In other words, if the first image area separation data (first attribute information) is made of 1-bit pixels and the character area and the picture areas are distinguished by 1 and 0, respectively, the second image area separation data (second attribute information) is also assumed to have the same format. Next, the image area separation data (attribute information) for each pixel are compared, and the number of pixels from the areas having differing data is counted (step S13). This determination of differing data may be done for all the pixels, a predetermined number or pixels, or for the pixels extracted by the extraction method. When the count of the number of pixels from the areas having differing data is determined to be less than a predetermined number (step S14), the first image area separation data (first attribute information) is specified as being corresponding to the image data input from outside and is transferred from the auxiliary storage device to the memory (step S15). The first image area separation data (first attribute information) is sequentially compared with the second image area separation data (second attribute information) until the first image area separation data (first attribute information) is specified.

The subsequent process is carried out using the specified image area separation data (attribute information). If a corresponding first image area separation data (first attribute information) is not found, the process may be carried out using the second image area separation data (second attribute information). Alternatively, without using the image area separation data (attribute information), image processing may be carried out on the entire image without switching processes according to the area.

The second image area separation process or the second image area separation data (second attribute information) may be different from the first image area separation process or the first image area separation data (second attribute information). For instance, only edge detection may be carried out in the second image area separation process, and the first image area separation data (first attribute information) may be specified by confirming that all the pixels that are determined to be character areas in the first image area separation data (first attribute information) have large edge amounts.

Thus, there is provided in the image processing apparatus according to the structure illustrated in FIG. 6 a second attribute information creating unit apart from the attribute information creating unit. When an image data is input from outside, this second attribute information creating unit creates a second attribute information from the image data input from outside. The specifying unit determines and specifies the attribute information to be used by comparing the second attribute information created by the second attribute information creating unit with the attribute information stored in the storing unit.

If no attribute information is specified by the specifying unit, then the processing unit carries out the process using the second attribute information.

Alternatively, if no attribute information is specified by the specifying unit, no attribute information is used and the processing unit carries out a uniform process on the image area without discriminating between character areas and picture areas.

Figure 8:
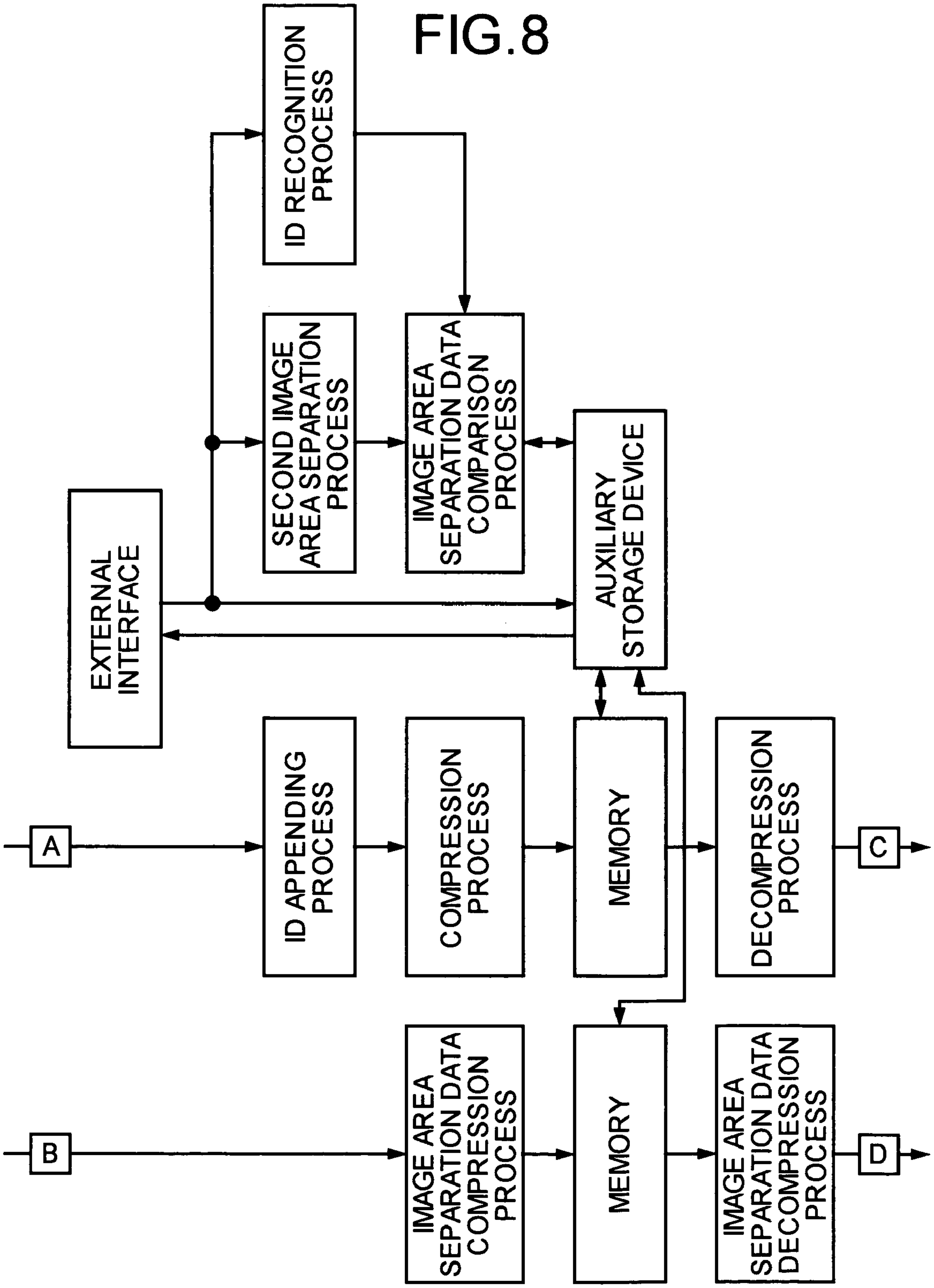
FIG. 8 is a block diagram of still another example of the image processing apparatus according to the present invention.

FIG. 8 is a block diagram of still another example of the image processing apparatus according to the present invention. The specification of the image area separation data (attribute information) in this structure is a combination of the specification illustrated in FIG. 1 and that illustrated in FIG. 6. More specifically, in the structure illustrated in FIG. 8, specification by the ID data as shown in the structure in FIG. 1 is carried out. Once thus specified, the second image area separation process creates the second image area separation data (second attribute information) and compares the second image area separation data (second attribute information) with the first image area separation data (first attribute information). This process accommodates the fact the image data that has been transferred outside may have been edited and therefore the possibility that the second image area separation data (second attribute information) and the first image area separation data (first attribute information) may not match. For instance, if the first image area separation data. (first attribute information) is separated into black character/color character/picture and the image transferred outside has to be edited in such a way that the black characters are converted to color characters, the areas that were judged to be black character will be now color character. Consequently the first image area separation result will no longer be applicable to those changed portions. Hence, a chromatic/achromatic decision is taken in the second image area separation process. In this process it is determined whether the first image area separation data (first attribute information) can be applied by checking if the black character area in the first image area separation data (first attribute information) is a achromatic area in the second image area separation data (second attribute information) and if the color character area in the first image area separation data (first attribute information) is a chromatic area in the second image area separation data (second attribute information). Further, by creating the second image area separation data (second attribute information) in the same format as the first image area separation process and by judging if the second image area separation data (second attribute information) and the first image area separation data (first attribute information) match under specific conditions, the possibility of specifying the incorrect image area separation data (attribute information) can be considerably reduced.

Thus, by providing a second image area separation process that accommodates the specifications of the first image area separation, or the image data that is transferred out and edited, the image area separation data (attribute information) can be specified more accurately.

Thus, there is provided in the image processing apparatus according to the structure illustrated in FIG. 8, a second attribute information creating unit apart from the attribute information creating unit. When an image data is input from outside, the second attribute information creating unit creates the second attribute information, and carries out correction by using the result obtained by comparing the specification by the specifying unit with the second attribute information and the attribute information stored in the storing unit.

If no attribute information is specified by the specifying unit, then the processing unit carries out the correction using the second attribute information. Alternatively, if no attribute information is specified by the specifying unit, the processing unit carries out a uniform correction, without using the attribute information, on the entire image area without discriminating between character areas and picture areas.

Figure 9:
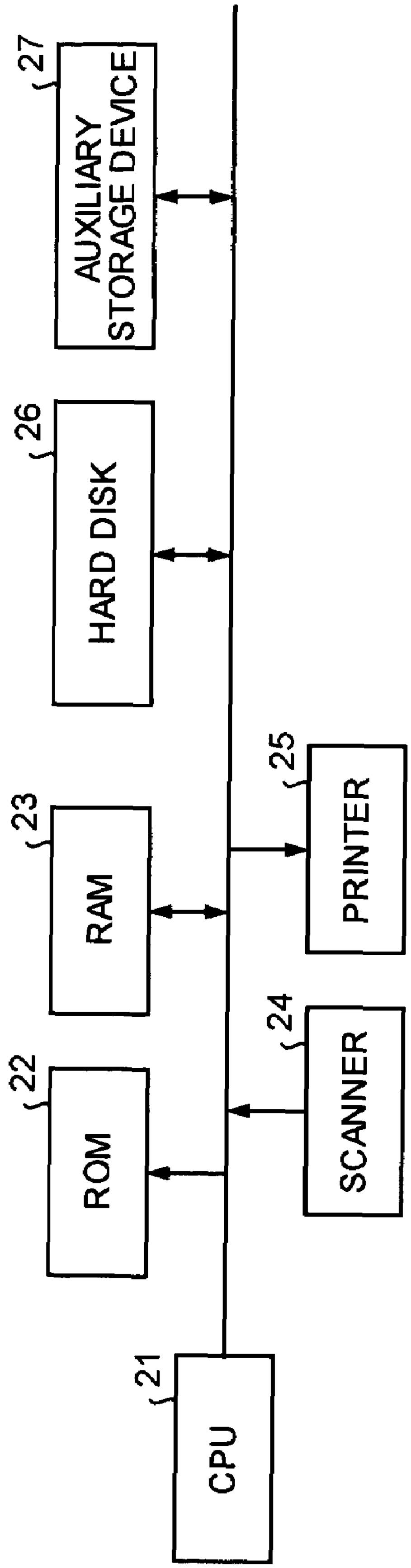
FIG. 9 is a block diagram of a hardware structure of the image processing apparatus according to the present invention.
Figure 10:
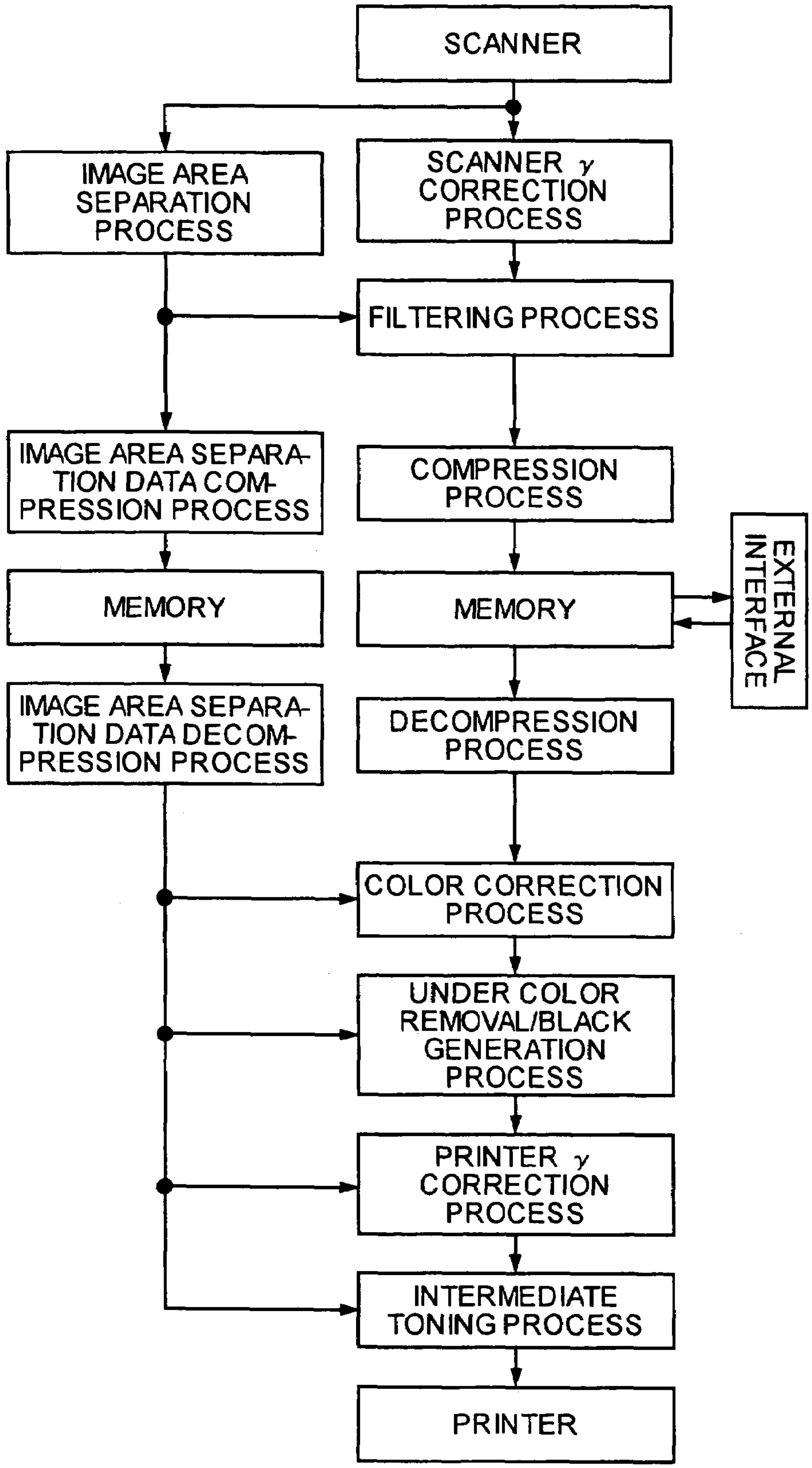
FIG. 10 is a block diagram of a flow of image processing of a copier.

FIG. 9 is a block diagram of a hardware structure of the image processing apparatus according to the present invention. This image processing apparatus is realized by a personal computer and the like, and includes a central processing unit 21 that controls all the operations, a read-only memory 22 which stores the control programs of the central processing unit 21, a random access memory 23 which is used as the work area of the central processing unit 21, a scanner 24, a printer 25, a hard disk 26, and an auxiliary storage device 27.

The central processing unit 21 includes the functions required for the processes and the functions of the units of the present invention as described above.

In other words, the present invention can be offered in the form of programs that make the computer (the central processing unit 21) realize the following functions. Namely, creation of attribute information that indicate the characteristics of an image from the image data, storing of the created attribute information, determining, when an image data is input from outside, if the attribute information created from the input data exist among the stored attribute information, and if present, specifying the attribute information, and processing the image data input from outside using the specified attribute information.

The present invention can further be offered in the form of programs that make a computer (central processing unit 21) realize the following functions by packaging them as a software package (more specifically, in the form of a storage medium such as a CD-ROM and the like), the function being, creation of attribute information that indicate the characteristics of an image from the image data, storing of the created attribute information, determining, when an image data is input from outside, if the attribute information created from the input data exist among the stored attribute information, and if present, specifying the attribute information, and processing the image data input from outside using the specified attribute information.

In other words, the image processing apparatus according to the present invention can be realized by making a general computer system provided with a scanner, printer, etc. read the programs recorded on the recording medium such as a CD-ROM and the like, and by the processing by the microprocessor of the computer system. Thus, the programs required for executing the processes of the present invention (in other words, the programs required by the hardware) are recorded on a storage medium. The storage medium need not necessarily be a CD-ROM and may be read-only memory, random access memory, flexible disk, memory card, etc. The programs recorded on the medium can also be installed on a storage medium built into the hardware system (such as the hard disk 26) and accessed and launched from there. Thus, the processes of the present invention can be realized from the CD-ROM on which the programs required for executing processes are recorded or by installing the programs on the hard disk and launching the programs from the hard disk.

According to the present invention, attribute information (image area separation data) of an image data to be transferred out are stored. When the image data is input again from outside, the attribute information (image area separation data) corresponding to that image data are specified and used. Thus the image data that has once been transferred out can be processed exactly like an image that has never been transferred out. Consequently, a high image quality can be obtained.

A specific data is embedded in the image data itself. Consequently, the versatility of the image data that is transferred out can be preserved. The image data is not tampered with in any way. Consequently, the image quality can be preserved.

Image area separation data can be specified more accurately based on a rigid specification method. Even if attribute information are not stored, appropriate processes according to the image area can be carried out.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for image processing, comprising:

an attribute creating unit that creates, from image data, attribute information that indicates image characteristics of the image data;

a storing unit that stores the attribute information;

a processing unit that carries out different image processing of pixels in different image areas of the first image data based on the attribute information;

a transferring unit that transfers the image data to an outside system;

an input unit that inputs image data from the outside system; and a determining unit that determines whether attribute information of the image data inputted by the input unit is stored in the storing unit, and specifies the stored attribute information of the image data inputted by the input unit as active attribute information if it is determined that the attribute information of the image data is inputted by the input unit stored in the storing unit, wherein the processing unit carries out a processing of the image data inputted by the input unit based on the active attribute information.

2. The image processing apparatus according to claim 1, further comprising:

an area determining unit that determines, based on the image characteristics, whether an image area is a character area or a picture area.

3. The image processing apparatus according to claim 1, further comprising:

an area determining unit that determines, based on the image characteristics, whether the an image area is a black character area, a color character area, or a picture area.

4. The image processing apparatus according to claim 1, further comprising:

an area determining unit that determines, based on the image characteristics, whether an image area is a character area, a halftone area, or a picture area.

5. The image processing apparatus according to claim 1, further comprising:

an appending unit that appends identification data to the image data to be transferred to the outside system, wherein the determining unit determines whether the identification data is included in the image data inputted by the input unit, and specifies the first attribute information as the active attribute information if it is determined that the identification data is included in the image data inputted by the input unit.

6. The image processing apparatus according to claim 5, wherein the appending unit appends the identification data as a header or footer of the image data.

7. The image processing apparatus according to claim 5, wherein the appending unit appends the identification data by embedding the identification data in the image data.

8. The image processing apparatus according to claim 1, further comprising:

a second attribute creating unit that creates, from the image data inputted by the input unit, second attribute information that indicates image characteristics; and an attribute comparing unit that compares the second attribute information with the attribute information stored in the storing unit, wherein the determining unit specifies the active attribute information based on a result of the comparison by the attribute comparing unit.

9. The image processing apparatus according to claim 5, further comprising:

a second attribute creating unit that creates, from the image data inputted by the input unit, second attribute information that indicates image characteristics;

an attribute comparing unit that compares the second attribute information with the first attribute information stored in the storing unit; and an attribute compensating unit that compensates for, based on a result of the comparison by the attribute comparing unit, the first attribute information specified by the determining unit.

10. The image processing apparatus according to claim 8, wherein when the attribute information is not specified by the determining unit, the processing unit carries out the processing of the image data inputted by the input unit based on the second attribute information.

11. The image processing apparatus according to claim 8, wherein when the attribute information is not specified by the determining unit, the processing unit carries out a uniform processing on entire image areas without using attribute information.

12. A method of image processing, comprising:

creating, from image data, attribute information that indicates image characteristics of the image data;

storing the attribute information in a storing unit;

performing different image processing of pixels in different image areas of the image data based on the first attribute information;

transferring the image data to an outside system;

inputting image data from the outside system;

determining whether attribute information of the image data inputted in the inputting step is stored in the storing unit;

specifying the stored attribute information of the image data inputted in the inputing step as active attribute information if the determining step determines that the attribute information of the image data inputted in the inputting step is stored in the storing unit; and performing different processing for different image areas of the image data based on the active attribute information.

13. The method according to claim 12, further comprising:

appending an identification data to the image data to be transferred to the outside system;

determining whether the identification data is included in the image data inputted in the inputting step; and specifying the stored attribute information as the active attribute information upon determining that the identification data is included in the image data inputted in the inputting step.

14. The method according to claim 12, further comprising:

creating, from the image data inputted in the inputting step, second attribute information that indicates image characteristics;

comparing the second attribute information with the attribute information stored in the storing unit; and specifying the active attribute information based on a result of the comparison.

15. A computer-readable recording medium for storing a computer program for image processing, the computer program making a computer execute the steps of:

creating, from image data, first attribute information that indicates image characteristics of the image data;

storing the attribute information in a storing unit;

performing different image processing of pixels in different image areas of the image data based on the attribute information;

transferring the image data to an outside system;

inputting image data from the outside system;

determining whether attribute information of the second image data inputted in the inputting step is stored in the storing unit;

specifying the stored attribute information of the image data inputted in the inputting step as active attribute information if the determining step determines that the attribute information of the image data inputted in the inputting step is stored in the storing unit; and performing different processing for different image areas of the first image data based on the active attribute information.

16. The computer-readable recording medium according to claim 15, the computer program further making a computer execute the steps of:

appending identification data to the image data to be transferred to the outside system;

determining whether the identification data is included in the image data inputted in the inputting step; and specifying the first attribute information as the active attribute information if it is determined that the identification data is included in the image data inputted in the inputting step.

17. The computer-readable recording medium according to claim 15, the computer program further making a computer execute the steps of:

creating, from the image data inputted in the inputting step, second attribute information that indicates image characteristics;

comparing the second attribute information with the attribute information stored in the storing unit; and specifying the active attribute information based on a result of the comparison.

* * * * *